US011787553B2

(12) United States Patent
Zhu

(10) Patent No.: US 11,787,553 B2
(45) Date of Patent: Oct. 17, 2023

(54) ENGINE LOADING REGULATION

(71) Applicant: Hamilton Sundstrand Corporation, Charlotte, NC (US)

(72) Inventor: Yonghua Zhu, Montluel (FR)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 333 days.

(21) Appl. No.: 17/154,296

(22) Filed: Jan. 21, 2021

(65) Prior Publication Data
US 2021/0229824 A1 Jul. 29, 2021

(30) Foreign Application Priority Data

Jan. 29, 2020 (EP) .................................... 20154367

(51) Int. Cl.
B64D 31/06 (2006.01)
B64D 13/08 (2006.01)
B64D 13/06 (2006.01)

(52) U.S. Cl.
CPC ...... B64D 31/06 (2013.01); B64D 2013/0662 (2013.01)

(58) Field of Classification Search
CPC ........ B60L 1/00428; B60L 1/00; B60L 53/14; B60L 1/02; B60L 2200/18; B60L 2200/36; H02J 3/32; H02J 2310/48; H02J 2310/60; H02J 4/00; Y02T 10/70; Y02T 10/7072; Y02T 10/88; Y02T 90/14; B60H 1/00428; B60H 1/00385; B60H 1/3232
See application file for complete search history.

(56) References Cited

U.S. PATENT DOCUMENTS

| 7,305,282 | B2* | 12/2007 | Chen | H02J 3/00 706/45 |
| 7,615,881 | B2* | 11/2009 | Halsey | F01D 15/10 60/773 |
| 7,622,821 | B2* | 11/2009 | Mehrer | H02J 4/00 244/75.1 |
| 8,039,983 | B2* | 10/2011 | Cote | H02P 9/04 290/51 |
| 8,209,101 | B2* | 6/2012 | Breit | H02J 3/14 701/80 |
| 9,593,591 | B2 | 3/2017 | Phillips et al. | |
| 2010/0023239 | A1* | 1/2010 | Self | G06Q 50/06 244/221 |
| 2010/0229809 | A1* | 9/2010 | Braly | F02P 5/04 29/888.011 |
| 2017/0036773 | A1* | 2/2017 | Jones | B64D 31/06 |
| 2018/0065752 | A1* | 3/2018 | Franco | B64D 13/06 |
| 2019/0005826 | A1* | 1/2019 | Lax | G08G 5/003 |

(Continued)

FOREIGN PATENT DOCUMENTS

EP 3421935 A1 1/2019

OTHER PUBLICATIONS

European Search Report for Application No. 20154367.5, dated Aug. 5, 2020, 6 pages.

Primary Examiner — Mussa A Shaawat
(74) Attorney, Agent, or Firm — CANTOR COLBURN LLP

(57) ABSTRACT

A method for regulating loading of an aircraft engine providing power to multiple loads, particularly ECS, comprising offloading selected power consuming loads according to a predetermined strategy when predetermined conditions are met.

7 Claims, 1 Drawing Sheet

(56) References Cited

U.S. PATENT DOCUMENTS

| | | |
|---|---|---|
| 2019/0113558 A1 | 4/2019 | Kumar et al. |
| 2020/0284204 A1* | 9/2020 | Cafaro ............... G05B 13/0205 |
| 2021/0171212 A1* | 6/2021 | Keller .................... B64D 31/06 |

* cited by examiner

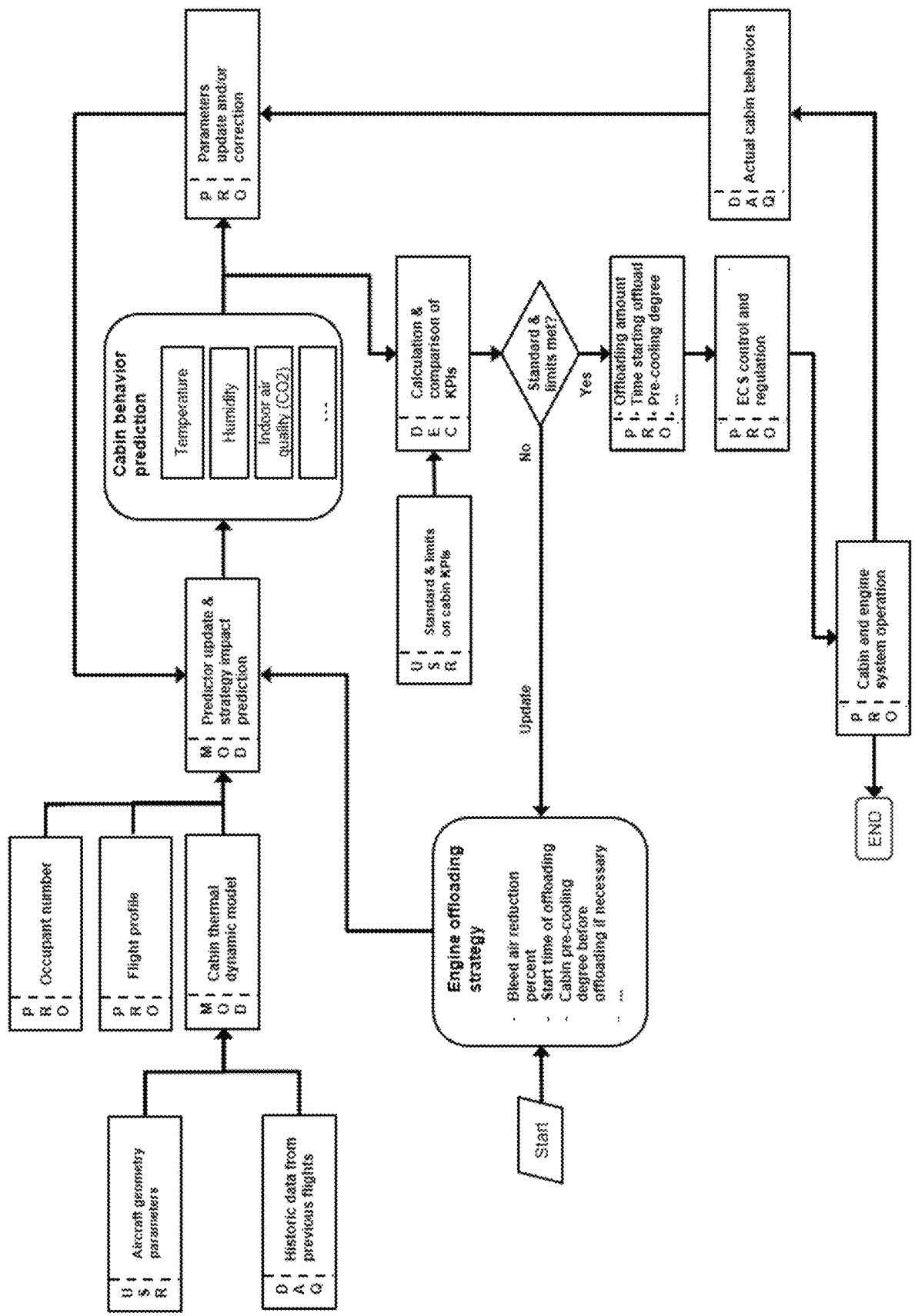

ENGINE LOADING REGULATION

FOREIGN PRIORITY

This application claims priority to European Patent Application No. 20154367.5 filed Jan. 29, 2020, the entire contents of which is incorporated herein by reference.

TECHNICAL FIELD

The present disclosure is concerned with providing a methodology for controlling the loading on an aircraft engine to extend engine life.

BACKGROUND

The engine of an aircraft is required to power high loads and the many demands on the engine affect engine life. Aircraft engines are large and expensive and it is vital that they are properly maintained to avoid engine failure during flight. Engines must be taken out of service before their end-or-life. It is, therefore, desirable for the life of an engine to be extended as long as possible but without reducing safety or functionality.

In addition to providing output to power aircraft flaps, slats, rudders, etc. which directly affect the flight of the aircraft, the engine is also used to provide power for other aircraft systems and auxiliary loads including the aircraft environmental conditioning system (ECS) which generally uses bleed air from the aircraft engine. Typically, the ECS consumes more than 50% of all non-propulsive energy. Systems are being designed, with the trend towards more electric aircraft (MEA), to use less bleed air, but even in such systems, the ECS still places a large demand on the engine.

The demand on the engine generally increases as the aircraft climbs, with the top-of-climb (TOC) being the flight phase that places most demand on the engine. During climb, the engine temperature increases, reaching a maximum at TOC. It is said around 40% or more of the life of the engine hot section is dictated by this flight phase, due to the high temperatures generated.

There is, therefore, a desire to reduce engine loading, particularly during flight phases where stress on the engine is high and high temperatures are reached.

SUMMARY

The present disclosure provides a method for regulating aircraft engine loading by offloading some power consuming loads according to a predetermined strategy when predetermined conditions are satisfied. More specifically, a strategy is formulated and evaluated by means of a model created on the basis of aircraft data for offloading auxiliary loads when predetermined criteria are satisfied, e.g. during aircraft climb, at or near TOC, when the overall engine load exceeds a given threshold, when the engine temperature exceeds a given temperature, etc. The auxiliary loading may be pneumatic, mechanical, electrical or a combination thereof. Offloading the ECS has been found by the inventors to work well as, with the right strategy, the engine demand can be reduced without any adverse impact on the aircraft system and its operation.

The offloading strategy of the disclosure comprises:
Defining a strategy for reducing engine loading;
Creating a model based on one or more aircraft parameters to evaluate the strategy;
Predicting effects on one or more aircraft characteristics using the strategy and the model;
Comparing the one or more characteristics resulting from the prediction with predetermined thresholds; and
In response to the comparison, either executing the strategy on the aircraft or adjusting the strategy.

Preferably, after executing the strategy, actual characteristics of the aircraft are compared to the predicted characteristics and the parameters and/or the model are adjusted based on the comparison.

The strategy may include features such as first reducing bleed air used in the ECS (e.g. bleed air may be compensated by using alternative air supplies), a start/end time for offloading, pre-cooling the aircraft cabin before commencing offloading of the ECS and other features (e.g. pre-cleaning cabin), to better maintain comfortable cabin conditions after offloading, etc.

The model created to evaluate the strategy will use a variety of input data, for example, but without limitation, the number of occupants in the aircraft, the flight profile, the thermal dynamics of the cabin, a profile of which can be generated using, e.g. parameters relating to the geometry of the aircraft, historic data from previous flights, etc.

The aircraft characteristics that are evaluated from the model may include temperature in the cabin, humidity, air quality (e.g. $CO_2$ levels) and/or other relevant cabin environment parameters.

BRIEF DESCRIPTION OF THE DRAWINGS

FIG. 1 is a flow chart showing an example of the methodology for controlling ECS offloading.

DETAILED DESCRIPTION

FIG. 1 is shown by way of example only. The principles of the disclosure can be applied to offloading other auxiliary loads and/or using different data, parameters, characteristics and/or strategy components.

Referring to FIG. 1, the method starts by formulating an engine offloading strategy 1 here, by ECS offloading. The strategy can include e.g. reducing the amount of bleed air used by the ECS (e.g. by using air from another source, or providing less conditioned air to the cabin), setting a time to start offloading (e.g. a certain number of minutes before TOC, or at a specific clock time, or a set time after take-off, or on reaching a given altitude, etc.) and/or providing pre-cooling to the cabin before offloading (e.g. if needed on hot days), etc.

A predictor model 2 is created from data 3 such as historic data, flight profile, occupant number etc.

The strategy is applied to the model to output predicted cabin characteristics or behaviours 4—i.e. to predict how offsetting the ECS according to the formulated strategy will impact cabin conditions. Cabin characteristics or 'key performance indicators' (KPIs) are used to quantify whether or not the selected strategy is a good strategy. In the example shown, KPIs include cabin temperature, humidity, CO2 levels, etc. The values of these KPIs due to the strategy can then be compared 5 with threshold values e.g. pre-set values based on industry standards and/or regulation limits, to identify any adverse impacts of the strategy. If the limits are not met, the strategy is not good and will be updated, e.g. by changing the reduction of bleed air, start time of offloading, etc. and the updated strategy is evaluated in the same way, and so on, until a good strategy is found. The selected strategy is then set to be executed to control 6 the aircraft ECS and the engine.

The actual effects of the strategy 7 are monitored to obtain feedback that can be used to update the model 8.

Advantages of this method include extending the engine life, fuel saving due to energy offloading, no change is required to the system structure, meaning the methodology is simple and cost-effective to implement.

The methodology can be used for offloading other types of auxiliary load other than the ECS.

The described embodiments are by way of example only. The scope of this disclosure is limited only by the claims.

The invention claimed is:

1. A method for regulating loading of an aircraft engine providing power to multiple loads, the method comprising:
   formulating a predetermined offload strategy;
   evaluating the predetermined strategy by means of a model created on the basis of aircraft data for offloading auxiliary loads when predetermined criteria are satisfied; and
   offloading selected power consuming loads according to the predetermined offload strategy when predetermined conditions are met;
   wherein formulating the predetermined strategy comprising:
   defining a strategy for reducing engine loading;
   creating a model based on one or more aircraft parameters to evaluate the strategy;
   predicting effects on one or more aircraft characteristics using the strategy and the model;
   comparing the one or more characteristics resulting from the prediction with predetermined thresholds; and
   in response to the comparison, either executing the strategy on the aircraft or adjusting the strategy;
   wherein the offload strategy includes one or more of: reducing use of bleed air in an environmental conditioning system of the aircraft; a start and/or end time for offloading; and pre-cooling a cabin of the aircraft before offloading.

2. The method of claim 1, wherein after executing the strategy, actual characteristics of the aircraft are compared to the predicted characteristics and the parameters and/or model are adjusted based on the comparison.

3. The method of claim 1, wherein the strategy includes one or more of:
   reducing use of bleed air in an environmental conditioning system of the aircraft,
   a start and/or end time for offloading,
   pre-cooling a cabin of the aircraft before offloading.

4. The method of claim 1, wherein the model is created based on one or more aircraft parameters, including but not limited to the number of occupants in the aircraft, a flight profile of the aircraft, thermal dynamics of an interior of the aircraft.

5. The method of claim 1, wherein the one or more characteristics include temperature, humidity, air quality, $CO_2$ levels.

6. A computer product having stored thereon instructions to perform the method of claim 1.

7. An apparatus including a processor configured to perform the method of claim 1.

* * * * *